United States Patent
Hsu

(10) Patent No.: US 11,720,198 B2
(45) Date of Patent: Aug. 8, 2023

(54) ELECTRONIC DEVICE AND TOUCH CONTROL METHOD THEREFOR

(71) Applicant: ASUSTEK COMPUTER INC., Taipei (TW)

(72) Inventor: Chen-Yu Hsu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/582,530

(22) Filed: Jan. 24, 2022

(65) Prior Publication Data

US 2023/0081709 A1    Mar. 16, 2023

(30) Foreign Application Priority Data

Sep. 16, 2021   (TW) ................. 110134552

(51) Int. Cl.
    *G06F 3/041*    (2006.01)
(52) U.S. Cl.
    CPC .................. *G06F 3/0416* (2013.01)
(58) Field of Classification Search
    None
    See application file for complete search history.

(56) References Cited

U.S. PATENT DOCUMENTS

| | | | |
|---|---|---|---|
| 2013/0234960 A1* | 9/2013 | Yamamoto | G06F 3/04883 345/173 |
| 2016/0026305 A1* | 1/2016 | Wu | G06F 1/1626 345/174 |

FOREIGN PATENT DOCUMENTS

| | | |
|---|---|---|
| CN | 105242867 A | 1/2016 |
| CN | 106843740 A | 6/2017 |
| TW | 201239713 A | 10/2012 |

OTHER PUBLICATIONS

Asus, ROG Phone 5 Ultimate, "Rear Touch Keys," https://dlcdnwebirngs.asus.com/files/media/BF6084EB-0DD2-47C8-B5A3-8CBF8EA5B59D/v1/features/images/video/medium/s6/s6_video_tab3.mp4 from https://rog.asus.com/tw/phones/rog-phone-5-ultimate-model/, published Mar. 10, 2021. 1 page with partial English translation.

ROG Taiwan, "ROG Phone 5" https://www.youtube.com/watch?v=f5MDtNQm8FM, published Mar. 10, 2021, screenshot at 43:15 / 2:1:17, 1 page with partial English translation.

* cited by examiner

*Primary Examiner* — Stephen T. Reed
(74) *Attorney, Agent, or Firm* — Muncy, Geissler, Olds & Lowe, P.C.

(57) ABSTRACT

The disclosure provides an electronic device, including a display region, a non-display region and a control unit. The display region includes a screen. The non-display region includes a touch sensor, configured to continuously detect a swipe gesture to generate a first detection signal and a second detection signal. A sliding trajectory corresponding to the first detection signal has a first distance, and a sliding trajectory corresponding to the second detection signal has a second distance. The control unit has a first preset value and a second preset value, and is configured to: receive a setting instruction to make the touch sensor correspond to a touch signal on the screen; and generate the touch signal when determining that the first distance is greater than the first preset value, and a sum of the first distance and the second distance is greater than the second preset value.

8 Claims, 7 Drawing Sheets

ELECTRONIC DEVICE AND TOUCH CONTROL METHOD THEREFOR

CROSS-REFERENCE TO RELATED APPLICATION

This application claims the priority benefit of Taiwan Application Serial No. 110134552, filed on Sep. 16, 2021. The entirety of the above-mentioned patent application is hereby incorporated by reference herein and made a part of the specification.

BACKGROUND OF THE INVENTION

Field of the Invention

The disclosure relates to an electronic device and a touch control method therefor.

Description of the Related Art

To provide users with more diversified operating modes, many handheld devices include additional touch sensors elsewhere off the existing touch screens to provide touch functions. A touch sensor includes a plurality of sensing units combined to detect an input source (such as a finger), report a detection position, and identify a swipe gesture by scanning a change of a touch position on a touch region. Because a scanning process takes time, if a process in which a user swipes is not fully detected, a swipe gesture is prone to be misjudged.

BRIEF SUMMARY OF THE INVENTION

The disclosure provides an electronic device. The electronic device includes a display region, a non-display region and a control unit. The display region includes a screen. The non-display region includes a touch sensor, configured to continuously detect a swipe gesture to generate a first detection signal and a second detection signal, where a sliding trajectory corresponding to the first detection signal has a first distance, and a sliding trajectory corresponding to the second detection signal has a second distance.

The control unit is electrically connected to the screen and the touch sensor. The control unit has a first preset value and a second preset value. The control unit is configured to: receive a setting instruction, where the setting instruction makes the touch sensor correspond to a touch signal generated at a specific position on the screen; and generate the touch signal when determining that the first distance is greater than the first preset value, and a sum of the first distance and the second distance is greater than the second preset value.

The disclosure further provides a touch control method for an electronic device. The electronic device includes a screen and a touch sensor. The touch control method includes: receiving a setting instruction, where the setting instruction makes the touch sensor correspond to a touch signal generated at a specific position on the screen; continuously detecting a swipe gesture through the touch sensor to generate a first detection signal and a second detection signal, where a sliding trajectory corresponding to the first detection signal has a first distance, and a sliding trajectory corresponding to the second detection signal has a second distance; and generating a touch signal when determining that the first distance is greater than the first preset value, and a sum of the first distance and the second distance is greater than the second preset value.

Through the electronic device and the touch control method provided in the disclosure, a swipe gesture on the touch sensor is accurately detected to avoid misjudgment. A detection result further triggers a drive instruction, to provide a user with more operation options.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
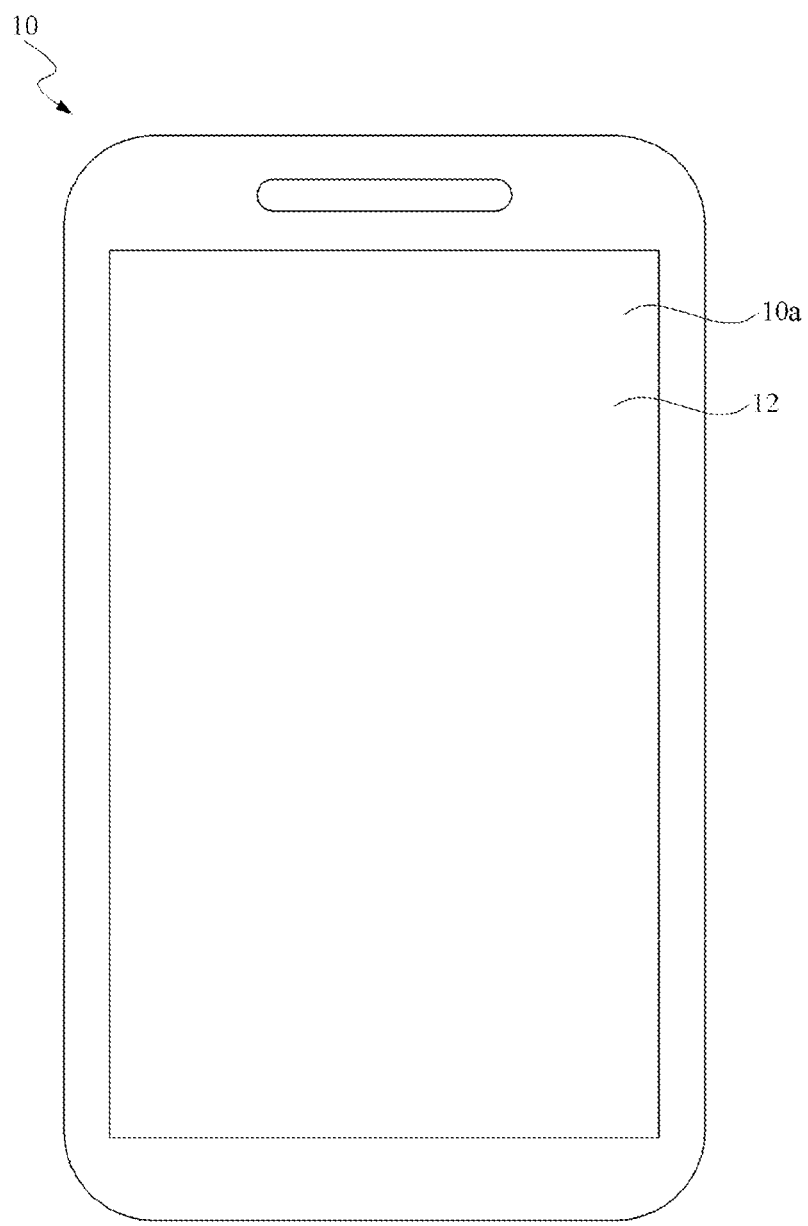
FIG. 1 to FIG. 3 are a schematic front view, a schematic rear view, and a schematic block diagram of an embodiment of an electronic device according to the disclosure.
Figure 2:
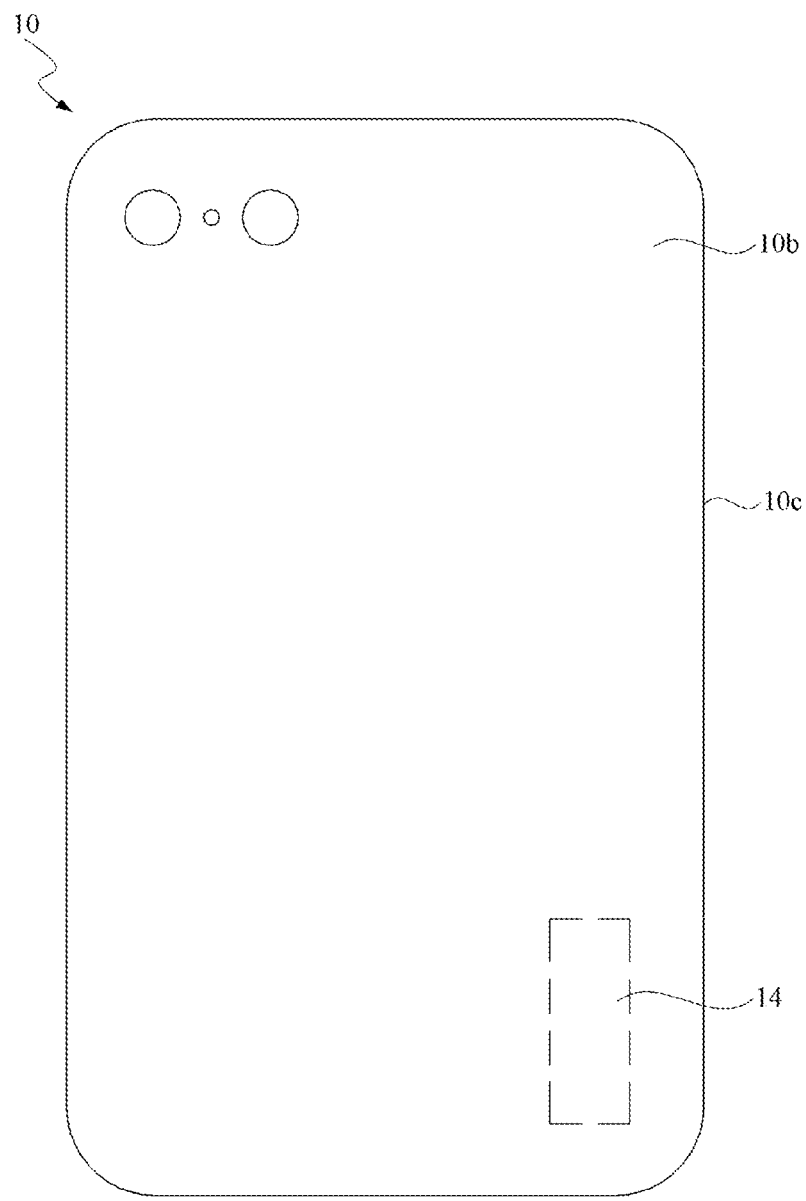
Figure 3:
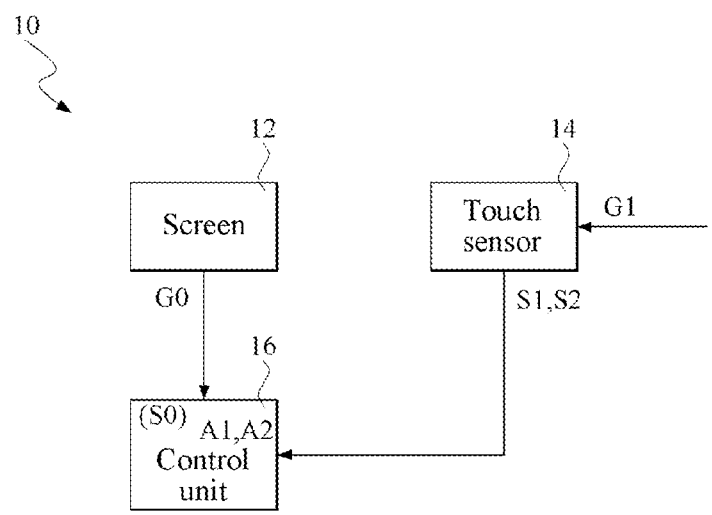

FIG. 1 to FIG. 3 are a schematic front view, a schematic rear view, and a schematic block diagram of an embodiment of an electronic device according to the disclosure.

As shown in the figures, the disclosure provides an electronic device 10. The electronic device 10 includes a display region 10*a*, a non-display region 10*b* and a control unit 16. In an embodiment, the electronic device 10 is a handheld electronic device such as a smartphone or a tablet computer.

The display region 10*a* includes a screen 12 inside. The screen 12 is a touch screen provided for a user to perform gesture operations. In addition, the user enters a setting instruction G0 through the screen 12 to set a touch signal S0 corresponding to a touch sensor 14 In an embodiment, a user sets that when the touch sensor 14 is triggered, the corresponding touch signal S0 is generated at a specific position on the screen 12.

The non-display region 10*b* includes a touch sensor 14 inside. The touch sensor 14 is configured to continuously detect a swipe gesture G1 to generate a first detection signal S1 and a second detection signal S2. The first detection signal S1 and the second detection signal S2 are detected during a first detection period and a second detection period that are consecutive. In one embodiment, the touch sensor 14 performs scanning in a fixed detection period. In other words, a time length of the first detection period is the same as that of the second detection period.

In this embodiment, the display region 10*a* is located on the front of the electronic device 10, and the non-display region 10*b* is located on the back and side surfaces of the electronic device. The screen 12 is disposed on the front of the electronic device 10, and the touch sensor 14 is disposed on the back of the electronic device 10.

A disposition position of the touch sensor 14 corresponds to a position at which a user touches the back of the electronic device 10 with a finger when the user holds the electronic device 10 for use. In this way, when holding the electronic device 10 for use, the user performs a touch operation on the back of the electronic device 10 with a finger. In another embodiment, the touch sensor 14 is disposed on a side surface of the electronic device 10. In another embodiment, the touch sensor 14 is disposed on the front of the electronic device 10 and is located at an edge of the screen 12.

In an embodiment, to match a horizontal use mode of the electronic device 10, the touch sensor 14 is rectangular in shape, and a long side direction of the touch sensor 14 is parallel to a long side 10c of the electronic device 10. In an embodiment, the touch sensor 14 is a capacitive touch sensor.

The control unit 16 is electrically connected to the screen 12 and the touch sensor 14. The control unit 16 has a first preset value A1 and a second preset value A2. The control unit 16 is configured to receive a setting instruction G0 through the screen 12, where the touch sensor 14 is made to correspond to a touch signal S0 generated at a specific position on the screen 12, and generate a touch signal S0 when a sliding trajectory corresponding to a first detection signal S1 and a second detection signal S2 generated by the touch sensor 14 meets a preset condition. A determining process and a corresponding operation performed by the control unit 16 for the first detection signal S1 and the second detection signal S2 are described in the following paragraphs in further detail.

Figure 4:
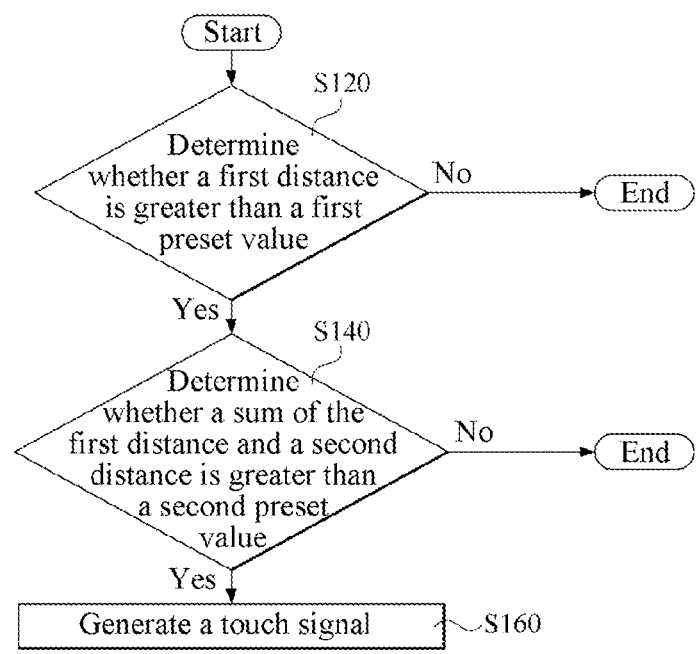
FIG. 4 shows an embodiment of a determining process performed by a control unit for a first detection signal and a second detection signal.

FIG. 4 shows an embodiment of a determining process performed by a control unit for a first detection signal S1 and a second detection signal S2. In this embodiment, a second-stage determining method is used to determine whether a touch signal S0 is generated. In an embodiment, a sliding trajectory of the first detection signal S1 has a first distance, and a sliding trajectory corresponding to the second detection signal S2 has a second distance.

As shown in FIG. 4, first, in step S120, the control unit 16 first determines whether the first distance is greater than a first preset value A1. When the first distance is greater than the first preset value A1, this process proceeds to step S140 to perform a second stage of determining: determining whether a sum of the first distance and the second distance is greater than a second preset value A2. When the first distance is less than the first preset value A1, this process ends.

In the second stage of determining, when the sum of the first distance and the second distance is greater than the second preset value A2, this process proceeds to step S160 to generate a touch signal S0. When the sum of the first distance and the second distance is less than the second preset value A2, this process ends. In an embodiment, the second preset value A2 is greater than or equal to twice the first preset value A1.

In an embodiment, the sliding trajectory is defined as a horizontal sliding trajectory or a vertical sliding trajectory, that is, a horizontal sliding distance or a vertical sliding distance corresponding to the first detection signal S1 and the second detection signal S2 is directly used as a basis for the determining. In another embodiment, the sliding trajectory is alternatively an oblique sliding trajectory or an arc sliding trajectory.

Figure 5:
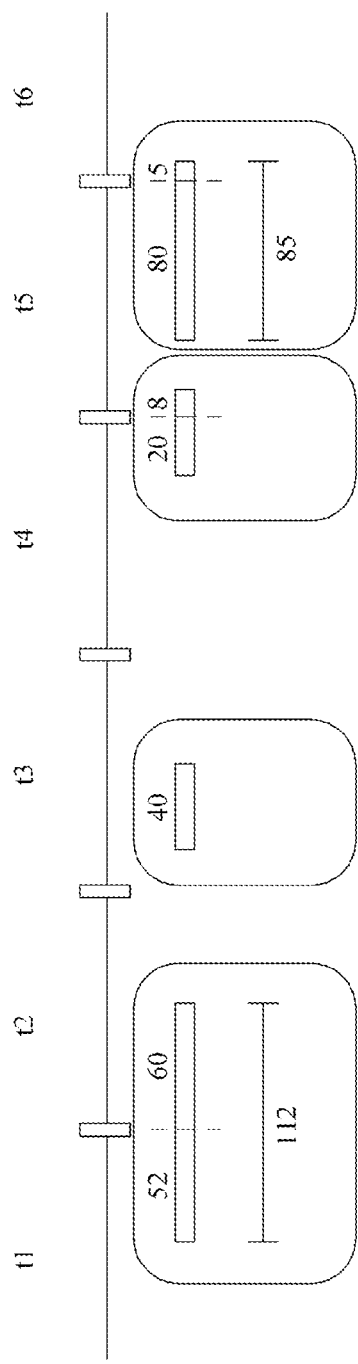
FIG. 5 shows, using different examples, an operation performed by a control unit based on a first detection signal and a second detection signal.

FIG. 5 shows, using different examples, an operation performed by a control unit 16 based on a first detection signal S1 and a second detection signal S2. In the figure, t1, t2, t3, t4, t5, and t6 represent detection periods. A long strip pattern under a time axis represents a distance of a sliding trajectory corresponding to a swipe gesture.

FIG. 5 shows four different swipe gestures. The first swipe gesture corresponds to detection periods t1 and t2, the second swipe gesture corresponds to detection periods t3 and t4, the third swipe gesture corresponds to detection periods t4 and t5, and the fourth swipe gesture corresponds to detection periods t5 and t6.

It is assumed that the first preset value A1 is 50 distance units, and the second preset value A2 is 100 distance units. For the first swipe gesture, a sliding trajectory corresponding to the first detection signal S1 has a first distance of 52 distance units, and a sliding trajectory corresponding to the second detection signal S2 has a second distance of 60 distance units. A first distance (52 distance units) is greater than a first preset value A1 (50 distance units), and a sum of the first distance and the second distance (52+60=112 distance units) is greater than a second preset value A2 (100 distance units). Therefore, the first swipe gesture generates a touch signal S0.

For the second swipe gesture, a sliding trajectory corresponding to the first detection signal S1 has a first distance of 40 distance units, and a sliding trajectory corresponding to the second detection signal S2 has a second distance of 0 distance unit. A first distance (40 distance units) is less than the first preset value A1 (50 distance units). Therefore, the second swipe gesture does not generate a touch signal S0.

For the third swipe gesture, a sliding trajectory corresponding to the first detection signal S1 has a first distance of 20 distance units, and a sliding trajectory corresponding to the second detection signal S2 has a second distance of 8 distance units. A first distance (20 distance units) is less than the first preset value A1 (50 distance units). Therefore, the third swipe gesture does not generate a touch signal S0.

For the fourth swipe gesture, a sliding trajectory corresponding to the first detection signal S1 has a first distance of 80 distance units, and a sliding trajectory corresponding to the second detection signal S2 has a second distance of 5 distance units. A first distance (80 distance units) is greater than a first preset value A1 (50 distance units), but a sum of the first distance and the second distance (80+5=85 distance units) is less than a second preset value A2 (100 distance units). The fourth swipe gesture does not generate a touch signal S0.

Figure 6:
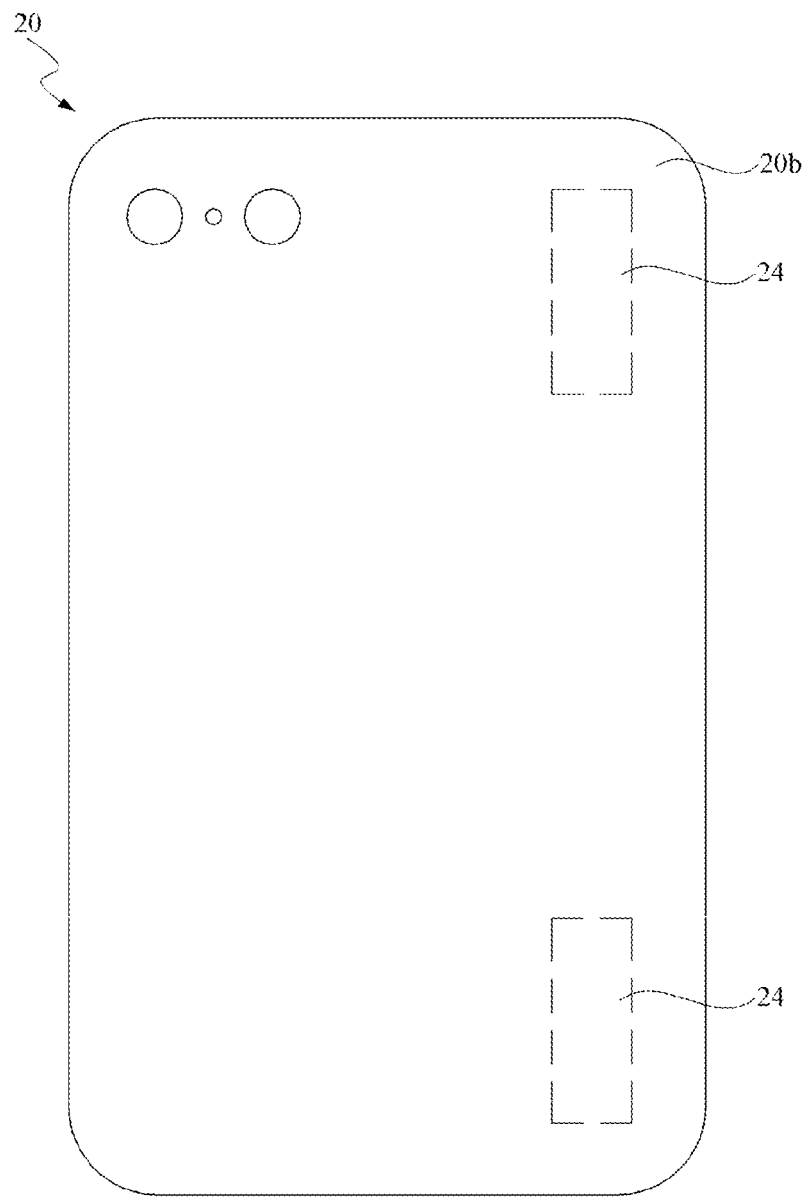
FIG. 6 is a schematic diagram of another embodiment of an electronic device according to the disclosure.

FIG. 6 is a schematic diagram of another embodiment of an electronic device according to the disclosure. The figure shows the back of the electronic device 20.

Compared with the embodiment of FIG. 2, in which the non-display region 10b of the electronic device 10 includes merely a single touch sensor 14, the non-display region 20b of the electronic device 20 of this embodiment includes two touch sensors 24. The two touch sensors 24 are symmetrically disposed on both sides of the non-display region 20b of the electronic device 20 along a long side direction of the electronic device, and correspond to positions gripped by the left and right hands of a user.

In this way, when holding the electronic device 20 for horizontal use, a user touches the touch sensors 24 on the back of the electronic device 20 with fingers of the left and right hands to perform operations. An operating mode of the touch sensor 24 of this embodiment is similar to that of the touch sensor 14 shown in FIG. 1 to FIG. 3, and details are not described herein again.

Figure 7:
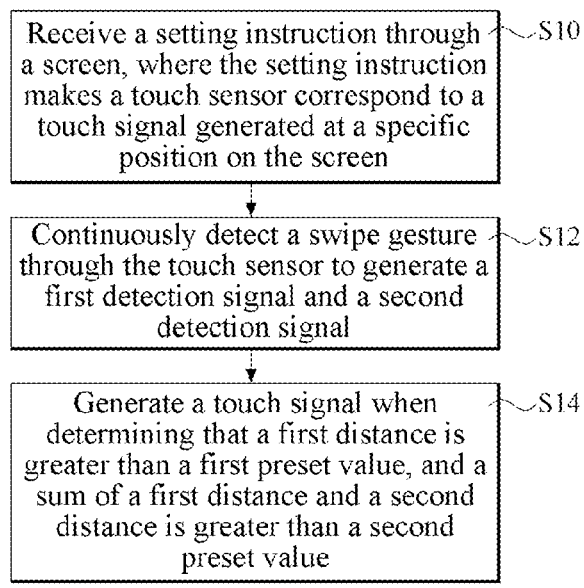
FIG. 7 is a flowchart of an embodiment of a touch control method according to the disclosure.

FIG. 7 is a flowchart of an embodiment of a touch control method according to the disclosure. The touch control method is applicable to the electronic device 10 shown in FIG. 1 to FIG. 3.

As shown in the figure, the touch control method includes the following steps. First, as shown in step S10, a setting instruction G0 is received through the screen 12, and the setting instruction G0 makes the touch sensor 14 correspond to a touch signal S0 generated at a specific position on the screen 12.

Subsequently, as shown in step S12, a swipe gesture G1 is continuously detected through the touch sensor 14 to generate a first detection signal S1 and a second detection signal S2. A sliding trajectory corresponding to the first detection signal S1 has a first distance, and a sliding trajectory corresponding to the second detection signal S2 has a second distance.

Next, as shown in step S14, a touch signal S0 is generated when it is determined that the first distance is greater than a first preset value A1, and the sum of the first distance and the second distance is greater than a second preset value A2.

Through the electronic device 10 or 20 and the touch control method provided in the disclosure, a swipe gesture G1 (especially a short swipe gesture) on the touch sensor 14 or the touch sensors 24 is accurately detected to avoid misjudgment. A detection result further triggers a touch signal S0, to provide a user with more operation options.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. An electronic device, comprising:
   a display region, comprising a screen;
   a non-display region, comprising a touch sensor, configured to continuously detect a swipe gesture to generate a first detection signal and a second detection signal, wherein a sliding trajectory corresponding to the first detection signal has a first distance, and a sliding trajectory corresponding to the second detection signal has a second distance; and
   a control unit, electrically connected to the screen and the touch sensor, having a first preset value and a second preset value, and configured to:
      receive a setting instruction, wherein the setting instruction makes the touch sensor correspond to a touch signal generated at a specific position on the screen; and
      generate the touch signal when determining that the first distance is greater than the first preset value, and a sum of the first distance and the second distance is greater than the second preset value,
   wherein the first detection signal and the second detection signal are respectively detected in a first detection period and a second detection period that are consecutive,
   wherein the touch sensor performs scanning to define the first detection period and the second detection period, and
   wherein the touch sensor performs scanning in the first detection period and the second detection period which are of the same time length.

2. The electronic device according to claim 1, wherein the first detection signal and the second detection signal are respectively detected in a first detection period and a second detection period that are consecutive, wherein the second preset value is greater than or equal to twice the first preset value.

3. The electronic device according to claim 1, wherein the screen is disposed on a front of the electronic device, and the touch sensor is disposed on a back of the electronic device.

4. The electronic device according to claim 1, wherein the screen is disposed on a front of the electronic device, and the touch sensor is disposed on a side surface of the electronic device.

5. The electronic device according to claim 1, wherein the screen is disposed on a front of the electronic device, and the touch sensor is disposed on the front and is located at an edge of the screen.

6. The electronic device according to claim 1, wherein the touch sensor is rectangular in shape, and a long side direction of the touch sensor is parallel to a long side of the electronic device.

7. The electronic device according to claim 1, wherein the electronic device comprises two touch sensors, wherein the two touch sensors are symmetrically disposed on the electronic device.

8. A touch control method for an electronic device, the electronic device comprising a screen and a touch sensor, the touch control method comprising:
   receiving a setting instruction, wherein the setting instruction makes the touch sensor correspond to a touch signal generated at a specific position on the screen;
   continuously detecting a swipe gesture through the touch sensor to generate a first detection signal and a second detection signal, wherein a sliding trajectory corresponding to the first detection signal has a first distance, and a sliding trajectory corresponding to the second detection signal has a second distance; and
   generating the touch signal when determining that the first distance is greater than a first preset value, and a sum of the first distance and the second distance is greater than a second preset value,
   wherein the first detection signal and the second detection signal are respectively detected in a first detection period and a second detection period that are consecutive,
   wherein the touch sensor performs scanning to define the first detection period and the second detection period, and
   wherein the touch sensor performs scanning in the first detection period and the second detection period which are of the same time length.

* * * * *